(12) United States Patent
Tartaglia et al.

(10) Patent No.: US 9,631,827 B2
(45) Date of Patent: Apr. 25, 2017

(54) LAMINAR AIR FLOW CAGE CHANGING CABIN MADE OF PLASTIC MATERIAL

(75) Inventors: Giovanni Tartaglia, Varese (IT); Andrea Mazzucchelli, Daverio (IT)

(73) Assignee: Tecniplast S.P.A., Buguggiate (IT)

( * ) Notice: Subject to any disclaimer, the term of this patent is extended or adjusted under 35 U.S.C. 154(b) by 947 days.

(21) Appl. No.: 13/703,226

(22) PCT Filed: Jun. 9, 2011

(86) PCT No.: PCT/EP2011/059597
§ 371 (c)(1),
(2), (4) Date: Dec. 10, 2012

(87) PCT Pub. No.: WO2011/154502
PCT Pub. Date: Dec. 15, 2011

(65) Prior Publication Data
US 2013/0084788 A1    Apr. 4, 2013

(30) Foreign Application Priority Data
Jun. 10, 2010    (IT) .............. MI2010A1050

(51) Int. Cl.
*F24F 7/00*      (2006.01)
*A01K 1/03*      (2006.01)
*F24F 3/16*      (2006.01)

(52) U.S. Cl.
CPC .............. *F24F 7/00* (2013.01); *A01K 1/031* (2013.01); *F24F 3/1603* (2013.01)

(58) Field of Classification Search
None
See application file for complete search history.

(56) References Cited

U.S. PATENT DOCUMENTS

| | | | | | |
|---|---|---|---|---|---|
| 1,580,774 | A | * | 4/1926 | Barker | A01K 31/17 119/455 |
| 2,730,033 | A | * | 1/1956 | Mellor | B05B 15/1203 454/53 |
| 3,301,167 | A | * | 1/1967 | Howard | B08B 15/023 454/60 |

(Continued)

FOREIGN PATENT DOCUMENTS

| | | |
|---|---|---|
| DE | 3531288 A1 | 9/1985 |
| WO | 01/32006 A1 | 5/2001 |
| WO | 02/094416 A1 | 11/2002 |

OTHER PUBLICATIONS

International Search Report and Written Opinion for PCT/EP2011/059597 dated Sep. 29, 2011 (9 pages).

*Primary Examiner* — Gregory Huson
*Assistant Examiner* — Martha Becton
(74) *Attorney, Agent, or Firm* — LeClairRyan, a Professional Corporation

(57) ABSTRACT

The present invention relates to a cage changing cabin (1) for replacing cages in which laboratory animals are housed, of the type comprising a supporting surface (21) supported by a lower box-like portion (20) and surmounted by a plenum or upper box-like portion (30), said lower box-like portion (20) and said upper plenum (30) comprising means for forced air circulation in laminar flow substantially tangent to the periphery of said supporting surface (21), characterized in that said lower box-like portion (20) and said upper plenum (30) are made of plastic material.

9 Claims, 5 Drawing Sheets

(56) References Cited

U.S. PATENT DOCUMENTS

| | | | | |
|---|---|---|---|---|
| 3,318,076 A * | 5/1967 | Baker | ............... | B08B 15/023 |
| | | | | 454/56 |
| 3,324,782 A * | 6/1967 | Norris | ............... | F24F 3/00 |
| | | | | 165/122 |
| 3,715,972 A * | 2/1973 | Kelso | ............... | B08B 15/02 |
| | | | | 312/239 |
| 4,508,486 A * | 4/1985 | Tinker | ............... | F04D 29/664 |
| | | | | 415/119 |
| 4,561,903 A * | 12/1985 | Blaul | ............... | B08B 15/026 |
| | | | | 134/10 |
| 4,860,643 A * | 8/1989 | Spearow | ............... | B08B 15/023 |
| | | | | 126/299 R |
| 5,809,936 A * | 9/1998 | Wall | ............... | A01K 1/00 |
| | | | | 119/484 |
| 6,183,527 B1 * | 2/2001 | O'Banion | ............... | A47L 5/365 |
| | | | | 15/347 |
| 6,729,266 B1 * | 5/2004 | Gabriel | ............... | A01K 1/031 |
| | | | | 119/419 |
| 6,758,875 B2 * | 7/2004 | Reid | ............... | B01D 46/0005 |
| | | | | 266/48 |
| 6,895,772 B2 * | 5/2005 | Johnson | ............... | F24F 5/0035 |
| | | | | 261/81 |
| 2004/0009746 A1 * | 1/2004 | Korman | ............... | A61G 10/04 |
| | | | | 454/284 |
| 2006/0075936 A1 * | 4/2006 | Shelton | ............... | B01D 46/02 |
| | | | | 108/50.13 |
| 2006/0105694 A1 * | 5/2006 | Tartaglia | ............... | A01K 1/031 |
| | | | | 454/56 |

\* cited by examiner

LAMINAR AIR FLOW CAGE CHANGING CABIN MADE OF PLASTIC MATERIAL

This application is a national stage application under 35 U.S.C. 371 of PCT Application No. PCT/EP2011/059597, filed Jun. 9, 2011, which claims the priority benefit of Italy Patent Application MI2010A001050, filed Jun. 10, 2010, which is hereby incorporated by reference in its entirety.

FIELD OF THE INVENTION

The present invention relates to a laminar air flow cabin for cage changing, particularly for the changing of cages intended for housing laboratory animals or intended for carrying out laboratory experimental procedures, which require a working area with controlled contamination.

STATE OF THE ART

It is well known that in laboratories and/or in animal breeding departments, animals such as typically rodents (mice and guinea pigs) but also other animals for scientific experiments, must be kept in cages in controlled environmental conditions, with various degrees of isolation from the surroundings depending on the type of experiment being conducted on the animals, so as to avoid contamination of the animals by the environment and/or contamination of the environment or of the laboratory technicians or researchers by the animals.

Therefore cages are used that can be provided with sealed closure, for example a cover and a gasket that can be provided on the cover or on the cage to ensure a hermetic joint between cover and tank.

The cages are then usually positioned on a rack and are provided with lateral guides and means for connecting to a ventilation system, for introduction of filtered and decontaminated air and/or for collecting air aspirated from the cages for subsequent operations of filtration and decontamination. Ventilated shelves that permit forced circulation of air in the cages have been developed and are normally used for this purpose.

SUMMARY OF THE INVENTION

Despite all these arrangements that are necessary for keeping the environmental conditions of the cages as controlled as possible, as is known, from time to time the cages themselves have to be replaced. The animals have to be transferred to new, clean cages so that those used up to this moment can be carefully washed according to the known washing operations.

Therefore the moment of cage changing, when the occupants of a cage are transferred to a new one, is a critical moment for operator safety and for possible environmental contamination.

This operation, denoted by the term "cage changing", usually takes place on the working surface of a laminar air flow cabin, called "cage changing cabin".

Since the animal housing rooms can be of very variable dimensions and in these rooms there may possibly be a very large number of ventilated shelves, it is preferable for the cage changing cabins to be provided with wheels so that they can be moved inside the laboratory close to said shelves, in order to reduce the distance from ventilated shelf to changing cabin as far as possible.

In fact, we should not underestimate on the one hand the stress that shaking of the cages can cause the animals housed in them during phases of transport, and on the other hand, and above all, the effort required of the operator for moving the cage changing cabin close to the shelves. The problem of the effort on the part of the operators is a very real problem, especially when we consider the very large number of cages that fill the shelves even in the case of animal houses of medium or medium-large dimensions.

As will readily be appreciated, the operation of cage changing to be repeated a great many times in a medium-sized or large animal house involves continual movements of the changing cabin within the laboratory, and fatigue and potential musculoskeletal problems resulting therefrom for the operator are a very important factor. The weight and the ergonomics of the cage changing cabins are therefore elements of great significance.

Currently, the constructional techniques for cage changing cabins of the type known from the prior art envisage that the structure of the cabin itself is constructed of a metal framework of painted steel or stainless steel. The technology used envisages press-bending and welding of the plates.

The first drawback of the cage changing cabins of the type known from the prior art is therefore connected with the weight. Cabins made of metal structures have a considerable weight. For example, a cabin having a working surface with a width of about 120 cm may be considered to weigh 220-250 kg.

Another aspect that is a disadvantage for the user is connected with the internal surfaces of the cabin, especially the internal surfaces of the zones of the cabin positioned below the working surface.

These surfaces are in fact difficult to clean thoroughly owing to the numerous interstices that form at the points where plates are joined or where there are welds. Moreover, the radii of curvature at the bends are minimal, and this further contributes to the difficulties of cleaning.

Another disadvantage of the cage changing cabins of the type known from the prior art is constituted by the fact that they generally have a fixed working surface, which constitutes a disadvantage, considering that the cages have variable dimensions, also in height, so that when it is necessary to process cages of greater height it would be useful to have a size of opening of the front glass of the cabin that is also larger, in order to permit easier movements for the operator in the operations of changing, without the bottom edge of the glass of the cabin being an obstacle to freedom of movement for the operator.

The main problem to be solved by the present invention is therefore to provide a changing cabin for cages for animals from the animal breeding department, for example rodents but not only rodents, that can eliminate the drawbacks left unsolved by the cages of the known type.

Within the scope of this problem, the aim of the present invention is to provide a cage changing cabin that is easier for the operator to move and is more ergonomic.

Another aim of the present invention is to provide a cage changing cabin that makes it possible to carry out a production process characterized by reduced costs of production and assembly times, which ultimately permits a further reduction of the costs of production.

Another aim of the present invention is to provide a cage changing cabin that makes it possible to solve the problem connected with damage of the structural parts of the cabin through the use of disinfectants, which, as is well known, are based on chlorine.

Yet another aim of the present invention is to provide a cage changing cabin that is more versatile in the case of cages of greater height, as well as making it possible to solve the risk that particularly active breeds of mice that accidentally end up on the working surface during the cage changing operations can get away from the working surface, simply by climbing over the edge of said surface.

This problem and these and other aims that will become clearer hereunder are achieved by a cage changing cabin of the type comprising a supporting surface supported by a lower box-like portion and surmounted by a plenum or upper box-like portion, said lower box-like portion and said upper plenum comprising means for forced air circulation in a laminar flow substantially tangent to the periphery of said supporting surface, characterized in that said lower box-like portion and said upper plenum are made of plastic material.

In particular, the cage changing cabin according to the present invention is characterized in that said lower box-like portion is preferably made of polyurethane foam, and said upper box-like portion or plenum is preferably made of ABS+PMMA (polymethyl methacrylate) obtained by thermoforming.

BRIEF DESCRIPTION OF THE FIGURES

Further characteristics and advantages of the present invention will become clearer from the following detailed description, given as a non-limiting example and illustrated in the accompanying drawings in which.

DETAILED DESCRIPTION OF PREFERRED EMBODIMENTS OF THE INVENTION

According to a preferred embodiment of the present invention illustrated in the aforesaid figures as a non-limiting example, the cage changing cabin 1 according to the present invention comprises a lower box-like portion 20 and an upper box-like portion 30, as is known from the prior art.

Figure 1:
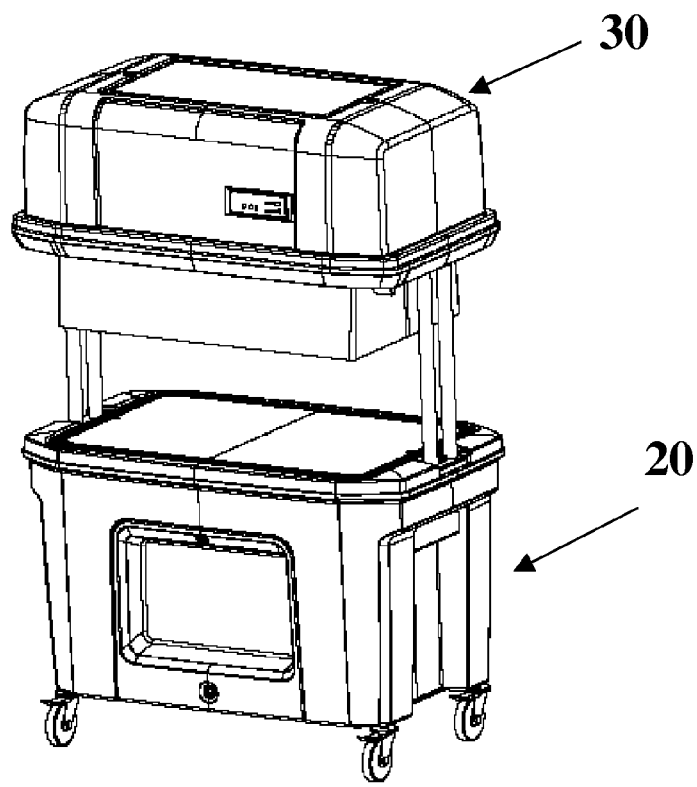
FIG. 1 shows an overall perspective view of the cage changing cabin according to the present invention.
Figure 2:
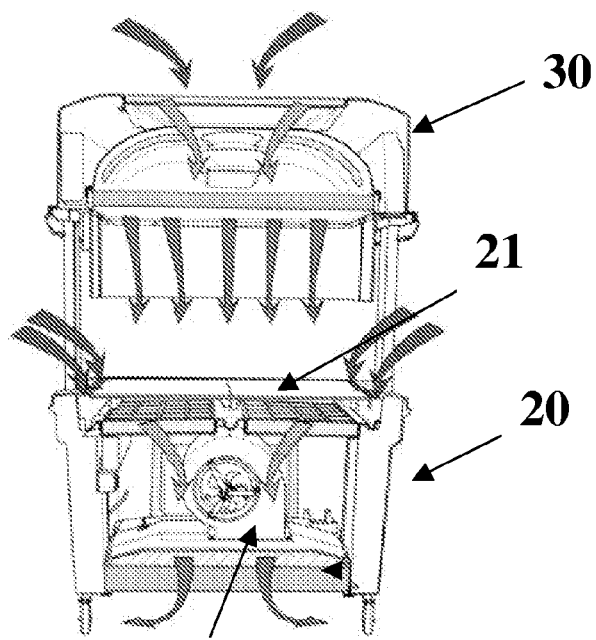
FIG. 2 shows a sectional front view of the cage changing cabin according to the present invention, showing schematically the path of the laminar air flow.

To create laminar flow according to the flow lines shown schematically in FIG. 2, the upper box-like portion directs fresh air onto an absolute filter positioned above the working zone, delimited at the bottom by the supporting surface 21. The supporting surface is thus provided with a vertical flow of sterile air in laminar conditions.

The supporting surface 21 has peripherally an air recovery grid 22. The air is aspirated through said grid from the working zone and, still owing to the extractor fan 23, is then expelled from the bottom zone of the lower box-like portion 20 after filtration by the absolute filter.

Figure 3:
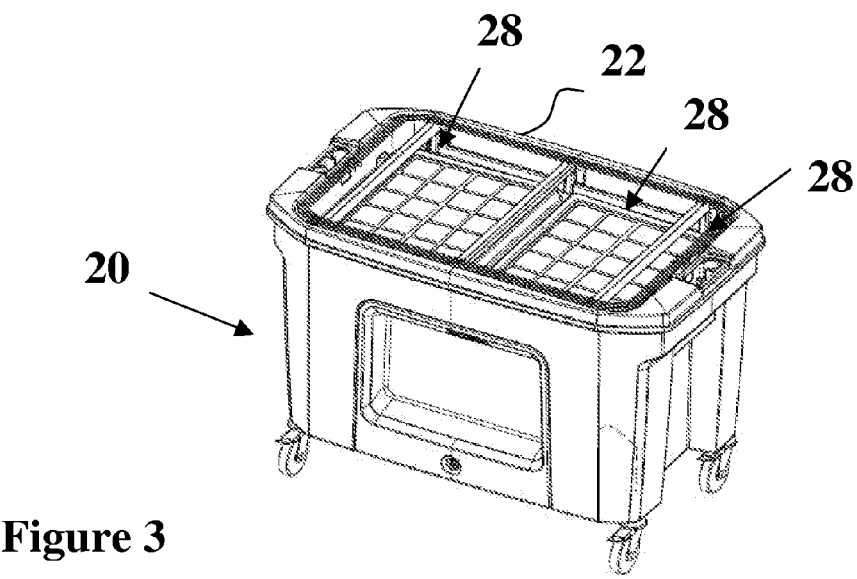
FIG. 3 shows a perspective view of the lower box-like portion of the cage changing cabin according to the present invention.
Figure 3A:
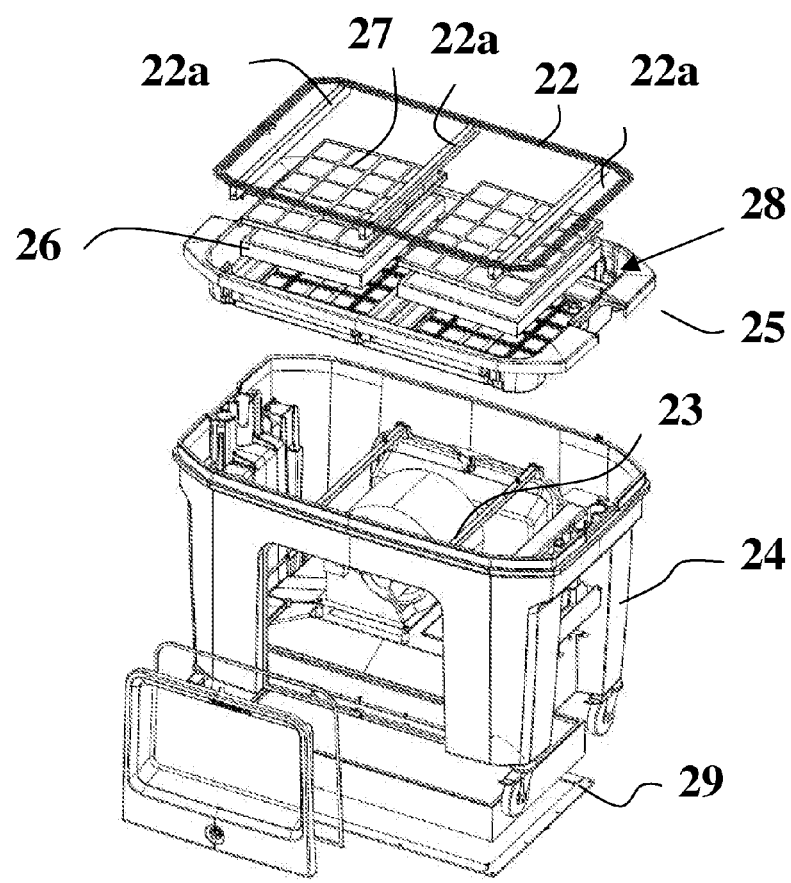
FIG. 3a shows a partially exploded view of the lower box-like portion of FIG. 3.

As can be seen more clearly from the exploded view in FIG. 3a, the lower box-like portion 20 is composed, according to the preferred embodiment illustrated here as an example of the present invention, of a supporting and containing cradle 24 made of plastic material, preferably polyurethane foam, which supports a supporting basin 25 also made of plastic material and provided with a perforated grid base surface, which can be seen in FIG. 3a. Said basin 25 can preferably be made of a thermoplastic resin, for example ABS (acrylonitrile butadiene styrene), since said element does not need to have high mechanical properties, and has the function, resting on the upper edge of said cradle 24, of supporting in its turn at least one filter element, constituted in the solution illustrated here by a pair of prefilters 26, above which protective hoods 27 are placed, and of supporting said air recovery grid 22.

Figure 5:
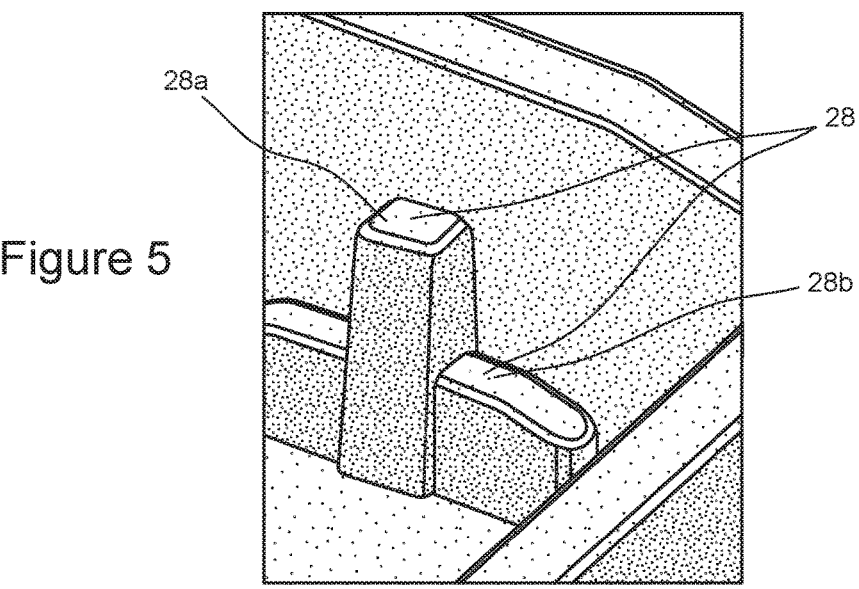
FIG. 5 shows a detail of the supporting device of the supporting surface that can be seen in FIGS. 4a, 4b and 4c.

FIG. 3a also shows, with the reference number 28, the elements for supporting the air recovery grid 22 made in the internal peripheral surface of said supporting basin 25. As can be seen more clearly from the detail in FIG. 5, at least two of said supporting elements are provided, indicated with 28a and 28b respectively, and said pairs of supporting elements are positioned at least to correspond to each vertex of the basin, preferably, as can be seen for example in FIG. 3, not only to correspond to the vertices but also to correspond to the middle of the long side of said basin 25.

These two supports 28a and 28b have different heights and make it possible to vary the height of grid 22 and, consequently, of the supporting surface 21 relative to the supporting basin 25.

Figure 4A:
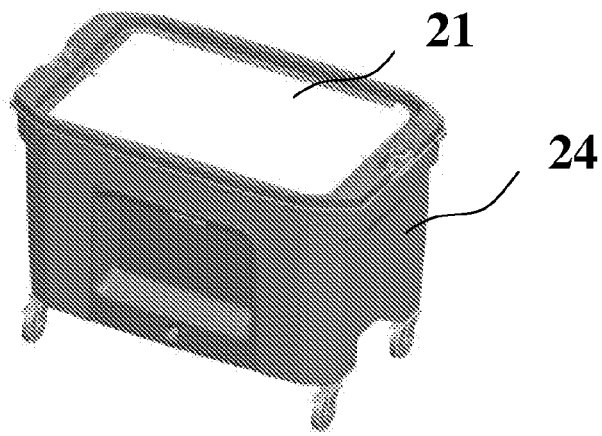
FIGS. 4a, 4b and 4c show the lower box-like portion of FIG. 3 respectively in a first configuration, in a configuration in which the supporting surface is raised, and in a second configuration.
Figure 4B:
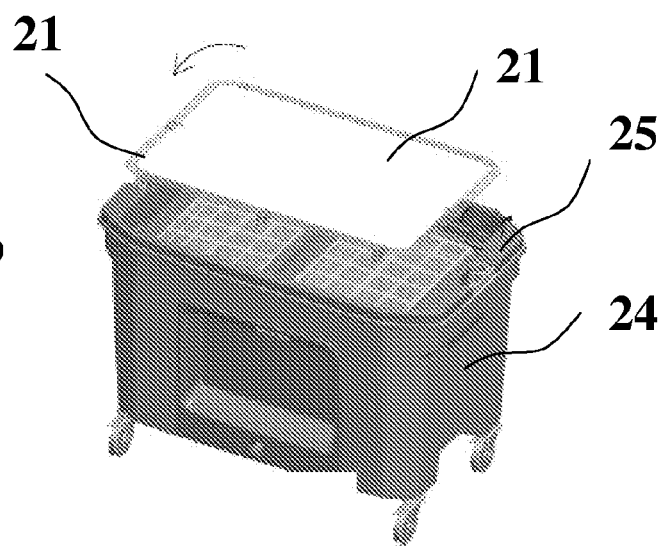

In particular, referring to FIG. 4a, it will be noted that the air recovery grid 22 and the supporting surface 21 are mounted in the supporting basin 25, the peripheral edge of basin 25 protruding to a certain height, preferably about 4 or more centimeters. This configuration of the supporting surface 21 and of grid 22 is obtained by having the lower portion of grid 22 supported on the reduced-height supports 28b, made as mentioned by moulding to correspond to the internal surface of the supporting basin 25.

In the example shown in the drawings, the air recovery grid 22 is provided with a plurality of bars 22a, and said bars, resting on the supporting elements 28a, 28b, permit positioning of grid 22 and of the supporting surface 21 inside the lower box-like portion, in particular inside the supporting basin 25.

By suitably positioning bars 22a relative to the transverse plane of symmetry of said grid 22, said bars can be caused to rest on the supports with greater height 28a and, by rotating said grid 22 through 180° on a horizontal plane, they can be caused to rest on the supports with reduced height 28b.

Figure 4C:
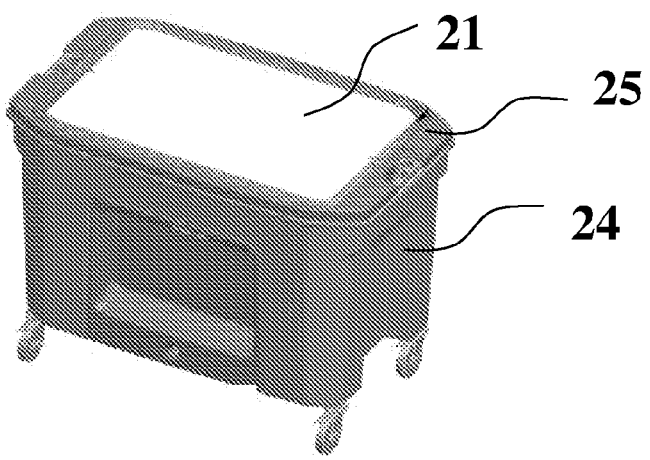
Figure 6:
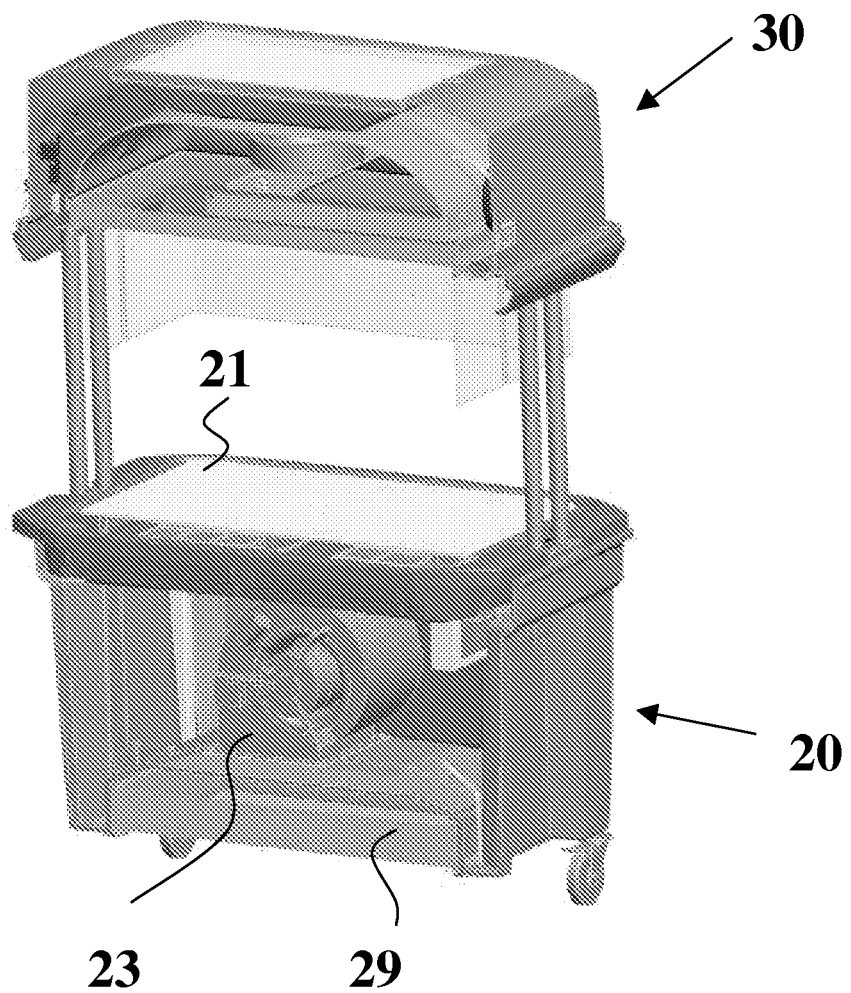
FIG. 6 shows a partially sectional perspective view of the cage changing cabin according to the present invention.

Owing to this particular arrangement, thus, by a simple rotation of the grid it is possible to change from the configuration in FIG. 4a in which the supporting surface 21 and the air recovery grid 22 are inserted relative to the peripheral edge of basin 25, to the configuration in FIG. 4c, in which grid 22 and supporting surface 21 are flush with basin 25.

Thus, as shown, the lower box-like portion 20 has a structural function in that it supports the weight of the entire apparatus. Inside the cradle 24, made of polyurethane, as mentioned, all the fixing points for the internal components are made during moulding (electric fan, pump, hydraulic cylinders, transformer, HEPA filter, columns supporting the top of the apparatus and so on), some of which have not been mentioned as they are common to cage changing cabins of the type known from the prior art.

The lower box-like portion 20 therefore performs a function of confinement of the aspiration volume. The extractor fan 23, contained inside the body, must only aspirate air through the prefilters 26, and to achieve this aim the lower box-like portion 20 is closed and air can only be aspirated through the air recovery grid 22.

Figure 3B:
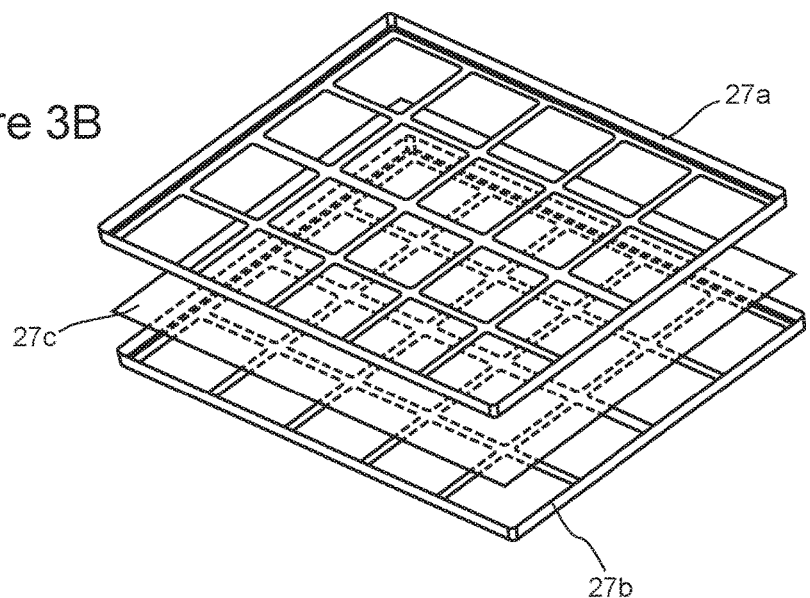
FIG. 3b shows an exploded view of a protective hood of the prefilters of the cage changing cabin according to the present invention.

Regarding the architecture of the prefilters, the changing cabin according to the present invention has a special feature. The prefilters 26 are covered, as mentioned, by the protective hoods 27. These protective hoods 27 are constituted of a sandwich comprising a pair of containing grids 27a, 27b made of polymer material, preferably of PVC (polyvinyl chloride), shaped as a grid as can be seen in FIG. 3b, which firmly hold a micro-perforated net 27c, primarily made of polyester, with thickness of some tenths of a millimeter, preferably 0.2 or 0.3 mm.

The protective hoods 27 provide protection of the prefilters and prevent material falling into the interstices around the prefilters. The particular configuration described here and illustrated in the accompanying drawings proves extremely advantageous since it is not possible to mould fastening points for the protecting net of the prefilters, and the containing grids 27a, 27b preferably made of PVC and thermoformed make it possible to overcome the problem of fixing of the micro-perforated net 27c. The sandwich constructed from the containing grids 27a and 27b is held together by connecting points by welding. The hoods 27 are fitted above the area of the prefilters 26 and close it completely to prevent ingress of dust.

The lower box-like portion also houses an exhaust filter 29, which filters the air propelled by the extractor fan 23 to the outside. The lower box-like portion 20 thus also has a function of plenum for air being expelled. On the end of cradle 24, the extractor fan 23 is mounted at the top and the exhaust filter 29 is mounted at the bottom. The intermediate zone is of a form so as to permit distribution of the air flow on the entire surface of the filter and in fact completes the expulsion plenum.

The configuration of the lower box-like portion 20, in particular of the upper edge, which receives the supporting basin 25, which protrudes outwards, functions as a bumper and protects the plastic parts.

Regarding the supporting basin 25, as mentioned, it is preferably made of ABS, preferably of ABS and PMMA (polymethyl methacrylate), and is produced by thermoforming. Basin 25 has both a structural function in that it supports the prefilters 26, the air recovery grid 22 and the supporting surface 21, and a function of containment and collection of liquids. In fact, the bottom of the basin is provided with rounded edges and is shaped so as to convey liquids that might fall from the working surfaces to an integrated outlet, positioned laterally. From this outlet, the liquids are discharged into a tank, also positioned laterally and removable.

It has thus been shown that the cage changing cabin according to the present invention achieves the proposed purpose and objects.

In particular, it has been shown that the cage changing cabin according to the present invention has a total weight that is notably reduced relative to the changing cabins of the type known from the prior art made of metal, in particular of stainless steel and/or of painted steel, thus obtaining a notable ergonomic improvement for the operators, who can frequently move this cabin inside the animal house and/or the various rooms of the laboratory much more easily. In fact, being made of plastic material, the cage changing cabin according to the present invention has a total weight more than 30% less than the average weight of the cabins of the known type made of metal, which is reflected in the effort on the part of the operator for moving said cabin that can be assessed on average at values approx. 20% less than that required for moving cage changing cabins of the conventional type.

Furthermore, the use of plastic material for making the cage changing cabin according to the present invention, in particular for making the lower box-shaped body 20 and the upper box-shaped body 30, as illustrated, makes it possible to eliminate the drawback of the cage changing cabins made of metal of the type known from the prior art, namely that the stainless steel parts are attacked by the disinfectants normally used for cleaning said cabin. In fact, these disinfectants normally contain chlorine, which has a very aggressive action on steels, and therefore the cleaning operations to which the cage must necessarily be submitted periodically lead to occurrence of the phenomenon of pitting, or local corrosion of the electrochemical type, of the surface of the metal.

Moreover, a further advantage from using plastic material for making the cage changing cabin according to the present invention is the greater facility in cleaning and decontamination of the surfaces. In fact, as already mentioned, the cage changing cabins of the conventional type made of metal have minimum bending radii at the edges, and this contributes to the difficulty of cleaning.

The use of plastic material for making the cage changing cabin according to the present invention provides a notable reduction in the number of components and therefore of the production and assembly times relative to the cabins made of metal of the type known from the prior art.

Moreover, it has been shown that the cage changing cabin according to the present invention makes it possible, because of the supporting elements 28a and 28b, to adjust the height of the supporting surface 21 relative to the edge of the supporting cradle 24. The possibility of adjusting the height of the supporting surface 21 means that, if during the operation of cage changing the animal accidentally ends up on the supporting surface 21, it has no way of escaping from said supporting surface, owing to the peripheral edge of several centimeters that is obtained on lowering the supporting surface 21. This possibility is particularly useful if the experimental procedures require the use of breeds of a particularly active type.

The possibility of altering the level of the supporting surface 21 can also facilitate the operations carried out by the laboratory technician when using animal cages of above-average height. It is in fact considered that the dimensions, and in particular regarding what is of interest here, the height of the animal cages is variable, therefore when using taller cages this would require a larger opening size of the front glass of the cabin, in order to allow easier movements on the part of the operator in the operations of changing, so that the bottom edge of the front glass does not constitute a troublesome obstacle. This advantage is provided by the changing cabin according to the present invention owing to the possibility of height adjustment of the supporting surface 21, in fact by increasing the clear height of the working area between said supporting surface and the front glass.

Numerous changes can be made by a person skilled in the art while remaining within the scope of protection of the present invention.

The scope of protection of the claims is not then to be limited by the illustrations or by the preferred embodiments presented as examples in the description, but rather the claims are to comprise all the characteristics of patentable novelty deducible from the present invention, including all characteristics that would be treated as equivalent by a person skilled in the art.

The invention claimed is:

1. A cage changing cabin for replacing cages for housing laboratory animals, comprising:
a supporting surface supported by a lower portion and surmounted by a plenum structure, the lower portion and the plenum structure comprising a fan configured to provide forced air circulation in a laminar flow substantially tangent to a periphery of the supporting surface, wherein the lower portion and the plenum structure are made of a plastic material, wherein the lower portion further comprises a supporting and containing cradle that supports a supporting basin having a perforated grid base surface, wherein the supporting basin supports an air recovery grid that supports the supporting surface, the air recovery grid peripherally protruding with respect to the supporting surface.

2. The cage changing cabin according to claim 1, wherein the lower portion is made of polyurethane foam.

3. The cage changing cabin according to claim 1, wherein the plenum structure is made of acrylonitrile butadiene styrene.

4. The cage changing cabin according to claim 1, wherein the supporting and containing cradle is made of polyurethane foam and the supporting basin is made of acrylonitrile butadiene styrene.

5. The cage changing cabin according to claim 1, wherein the supporting basin supports at least one prefilter on the perforated grid base surface.

6. The cage changing cabin according to claim 5, wherein the at least one prefilter is covered by a protective hood comprising a pair of containing grids configured to firmly hold a micro-perforated net in a sandwich structure.

7. The cage changing cabin according to claim 6, wherein the pair of containing grids are made of polyvinyl chloride, and the micro-perforated net is made of polyester.

8. The cage changing cabin according to claim 1 further comprising a height-adjusting device for adjusting the position of the supporting surface with respect to the edge of the lower portion.

9. The cage changing cabin according to claim 8, wherein the height-adjusting device comprises a plurality of supporting elements located at the inner surface of the supporting basin and having different heights, the plurality of supporting elements configured to selectively support the air recovery grid so as to adjust the position of the air recovery grid with respect to the supporting basin.

* * * * *